N. M. HALE.
Cotton Chopper.
No. 109,124. Patented Nov. 8, 1870.
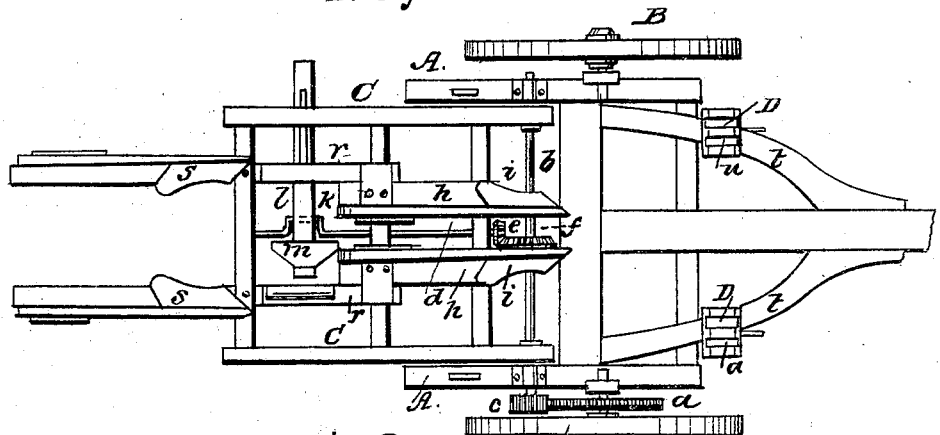
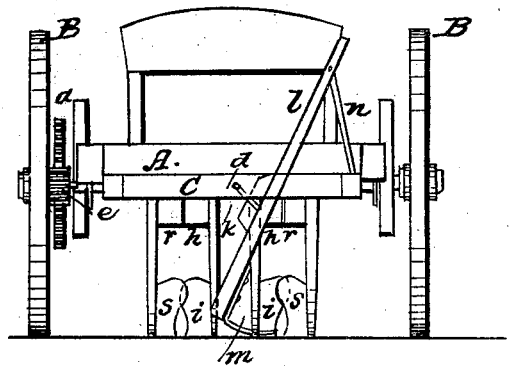
Witnesses
H. J. Aretz
Thos. D. McOmard
Inventor
Nathan M. Hale
by his Attorneys

UNITED STATES PATENT OFFICE.

NATHAN M. HALE, OF CLEBORNE, TEXAS.

IMPROVEMENT IN COTTON SCRAPERS AND CHOPPERS.

Specification forming part of Letters Patent No. 109,124, dated November 8, 1870.

*To all whom it may concern:*

Be it known that I, NATHAN M. HALE, of Cleborne, in the county of Johnson and State of Texas, have invented a new and Improved Cotton Scraper and Chopper; and I do hereby declare the following to be a full, clear, and exact description of the same, reference being had to the accompanying drawings, making a part of this specification, in which—

Figure 1 is a plan view of the under side of the machine, and Fig. 2 is a rear elevation.

This invention consists in the combination of a pair of plows placed just far enough apart to run one at each side of a row of cotton-plants and close to the same, for the purpose of laying them bare of dirt, with a hoe placed in rear of the said plows, for chopping the row transversely into stands, and with a second pair of plows placed in rear of the hoe and arranged so as to throw dirt toward the plants from each side, in order to form a ridge, the said hoe being combined with a mechanism which operates it as the plow is drawn along.

In the drawings, A is a frame-work supported upon wheels B B; $a$, a toothed disk attached to and concentric with one of the wheels B; $b$, a shaft mounted in boxes transversely of the rear part of the frame A. $c$ is a pinion fixed on one end of the shaft $b$, gearing with the toothed disk $a$ and receiving motion from it. C is a rectangular frame that is pivoted at its front end upon the shaft $b$. $d$ is a shaft extending centrally of the frame C. $e$ is a bevel-pinion fixed on the front end of the shaft $d$. $f$ is a bevel-pinion gearing with $e$ and fixed on the shaft $b$. $h$ $h$ are beams fastened to the lower side of the frame C, one at each side of the shaft $d$. $i$ $i$ are the front plows, that throw dirt from the plants, said plows being secured to the inner sides of the beams $h$. $k$ is a crank in the shaft $d$. $l$ is a beam hung in said crank, bearing at its lower extremity a hoe, $m$, and jointed at its upper end to the upper end of the arm $n$, that projects from a bar which is mounted in eyes on the upper surface of one of the side pieces of the frame C. The crank $k$ derives a rotary motion ultimately from the master-wheel through the medium of the disk $a$ and shafts $b$ $d$, and the arm $n$ transmutes this motion into a drawing cut on the part of the hoe $m$ at every revolution of the crank. Beams $r$ $r$ are also fastened to the under part of the frame C, parallel with and outside of the beams $h$. $s$ $s$ are the rear plows, which throw dirt inward toward the plants from each side, and are secured to the outer sides of the beams $r$.

Any suitable means are employed for enabling the driver, from his seat, to raise the frame C and plows out of the earth.

Hangers D D are attached to the hounds $t$ $t$, and are provided with mortises $u$ in their lower ends. The mortises are intended for the reception of tenons on the ends of cultivator-bars, which may be used in lieu of the plows. When the cultivator is employed, the plows should be removed, as they easily may be.

Having thus described my invention, what I claim as new, and desire to secure by Letters Patent, is—

The combination of the frame C, throwing-on plows $s$ $s$, throwing-off plows $i$ $i$, and oscillating hoe $m$, when all these parts are arranged as described.

NATHAN M. HALE.

Witnesses:
O. P. ARNOLD,
T. D. KORDIN.